US012719877B2

(12) United States Patent
Hassan et al.

(10) Patent No.: US 12,719,877 B2
(45) Date of Patent: Aug. 25, 2026

(54) ELECTRONIC DOCUMENT COLLABORATION SYSTEMS AND METHODS

(71) Applicant: The Bank of New York Mellon, New York, NY (US)

(72) Inventors: Jeffrey Hassan, South Orange, NJ (US); Rafal Sitkowski, Watchung, NJ (US); Hood Qaim-Maqami, Montclair, NJ (US); Carl Albert Johnson, Yardley, PA (US); Liza D. Antignani, Staten Island, NY (US)

(73) Assignee: The Bank of New York Mellon, New York, NY (US)

( * ) Notice: Subject to any disclaimer, the term of this patent is extended or adjusted under 35 U.S.C. 154(b) by 75 days.

(21) Appl. No.: 18/312,118

(22) Filed: May 4, 2023

(65) Prior Publication Data

US 2024/0372864 A1 Nov. 7, 2024

(51) Int. Cl.
*G06F 3/0484* (2022.01)
*G06F 21/60* (2013.01)
*H04L 9/40* (2022.01)

(52) U.S. Cl.
CPC .......... *H04L 63/102* (2013.01); *G06F 3/0484* (2013.01); *G06F 21/604* (2013.01)

(58) Field of Classification Search
None
See application file for complete search history.

(56) References Cited

U.S. PATENT DOCUMENTS

| | | | | |
|---|---|---|---|---|
| 6,163,776 | A * | 12/2000 | Periwal | G06F 16/289 |
| 8,996,985 | B1 | 3/2015 | Johnston et al. | |
| 10,019,427 | B2 | 7/2018 | Wilde et al. | |
| 10,346,562 | B2 | 7/2019 | Kapalko | |
| 2006/0143459 | A1 | 6/2006 | Villaron et al. | |
| 2006/0282762 | A1 | 12/2006 | Diamond et al. | |
| 2007/0011606 | A1 | 1/2007 | Bagheri | |
| 2012/0210247 | A1* | 8/2012 | Khouri | G06Q 10/101 715/751 |
| 2013/0283147 | A1 | 10/2013 | Wong et al. | |
| 2017/0178266 | A1* | 6/2017 | Schmidt | G06F 40/134 |
| 2018/0189255 | A1* | 7/2018 | Kofman | G06F 3/0482 |
| 2018/0191659 | A1* | 7/2018 | Tene | H04L 51/216 |
| 2018/0191660 | A1 | 7/2018 | Tene et al. | |
| 2019/0179501 | A1* | 6/2019 | Seeley | G06F 16/178 |
| 2023/0055241 | A1* | 2/2023 | Zionpour | G06F 16/958 |

* cited by examiner

*Primary Examiner* — Rinna Yi
(74) *Attorney, Agent, or Firm* — Foley & Lardner LLP

(57) ABSTRACT

Electronic document collaboration systems and methods includes one or more processors, one or more memory components communicatively coupled to the one or more processors, and machine readable instructions. The machine readable instructions cause the system to access an electronic document on a graphical user interface by a participant user of a collaborator group of one or more collaborator groups assigned to an entity of a plurality of entities, add a comment to the displayed electronic document via an entry by the participant user into the electronic document, assign the comment a unique identifier, prompt the participant user to select a security designation for the comment in response to the comment being added to the electronic document, and associate the security designation with the unique identifier of the comment.

20 Claims, 5 Drawing Sheets

ELECTRONIC DOCUMENT COLLABORATION SYSTEMS AND METHODS

TECHNICAL FIELD

The present specification generally relates to electronic document collaboration systems, and more particularly, to systems and methods for securely collaborating on electronic documents.

BACKGROUND

With the increasing use of electronic documents in various domains, there is a growing need for efficient collaboration among different entities and groups of participants. While document collaboration systems may allow participants to access, edit, and share documents online, a need exists for an electronic document collaboration system that provides an efficient way to collaborate on electronic documents across entities, groups, organizations, departments, and/or the like.

SUMMARY

According to the subject matter of the present disclosure, an electronic document collaboration system may include one or more processors, one or more memory components communicatively coupled to the one or more processors, and one or more machine readable instructions stored in the one or more memory components. The machine readable instructions may cause the electronic document collaboration system to perform at least the following when executed by the one or more processors: access an electronic document in response to receiving input via a graphical user interface from a participant user of a collaborator group of one or more collaborator groups assigned to an entity of a plurality of entities, wherein said collaborator group and said entity are assigned access rights to the electronic document, cause the electronic document to be displayed via the graphical user interface, and add a comment to the electronic document via an entry by the participant user into the electronic document. The one or more machine readable instructions may further cause the electronic document collaboration system to perform at least the following when executed by the one or more processors: assign the comment a unique identifier, prompt the participant user to select a security designation for the comment in response to the comment being added to the electronic document, and associate the security designation with the unique identifier of the comment. The security designation may comprise a selection of one or more collaborator groups of one or more entities of the plurality of entities to which to assign access rights to the comment, each group including one or more participant users.

According to another embodiment of the present disclosure, a computer-implemented method for collaborating on an electronic document may include: accessing the electronic document in response to receiving input via a graphical user interface by a participant user of a collaborator group of one or more collaborator groups assigned to an entity of a plurality of entities, wherein said collaborator group and said entity are assigned access rights to the electronic document, and causing the electronic document to be displayed via the graphical user interface. The method may further include adding a comment to the electronic document via an entry by the participant user into the electronic document, assigning the comment a unique identifier, prompting the participant user to select a security designation for the comment in response to the comment being added to the electronic document, and associating the security designation with the unique identifier of the comment. The security designation may comprise a selection of one or more collaborator groups of one or more entities of the plurality of entities to which to assign access rights to the comment, each group including one or more participant users.

According to yet another embodiment of the present disclosure, a computer-implemented method for collaborating on an electronic document may include: accessing the electronic document in response to receiving input via a graphical user interface by a participant user of a collaborator group of one or more collaborator groups assigned to an entity of a plurality of entities, wherein said collaborator group and said entity are assigned access rights to the electronic document, causing the electronic document to be displayed via the graphical user interface, adding a comment to the electronic document via an entry by the participant user into the electronic document, and assigning the comment a unique identifier. The method may further include prompting the participant user to select a security designation for the comment in response to the comment being added to the electronic document, wherein the security designation comprises a selection of one or more collaborator groups of one or more entities of the plurality of entities to which to assign access rights to the comment, each group including one or more participant users, associating the security designation with the unique identifier of the comment, displaying the comment on the graphical user interface based on the security designation, modifying the security designation for the comment, and displaying the comment on the graphical user interface based on the security designation as modified.

The additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals in which:

DETAILED DESCRIPTION

In various embodiments described herein, electronic document collaboration systems and methods include addition of a comment to an electronic document by an assigned participant user and selection of security and access rights as a security designation for the comment when added by the participant user. The comment is further assigned a unique identifier, the security designation is associated with the unique identifier, and each is stored in a system data store. Effectively, security designations may be selected by participant users on a comment-by-comment basis. Further, collaborator groups across one or more entities may be provided access rights to the added comments. Each collaborator group may be associated with an entity and include one or more participant users.

As provided herein, the term "entity" may be used to refer to various organizations, departments, teams, groups, or similar entities within a business, governmental, or other similar organization. Accordingly, for purposes of the present disclosure, it should be understood that the term "entity" may encompass any number of separate groups capable of collaborating on an electronic document.

Embodiments of the present disclosure are thus directed to electronic document collaboration systems and computer-implemented methods of securely collaborating on an electronic document, as will now be described in more detail herein with reference to the drawings and where like numbers refer to like structures.

Figure 1:
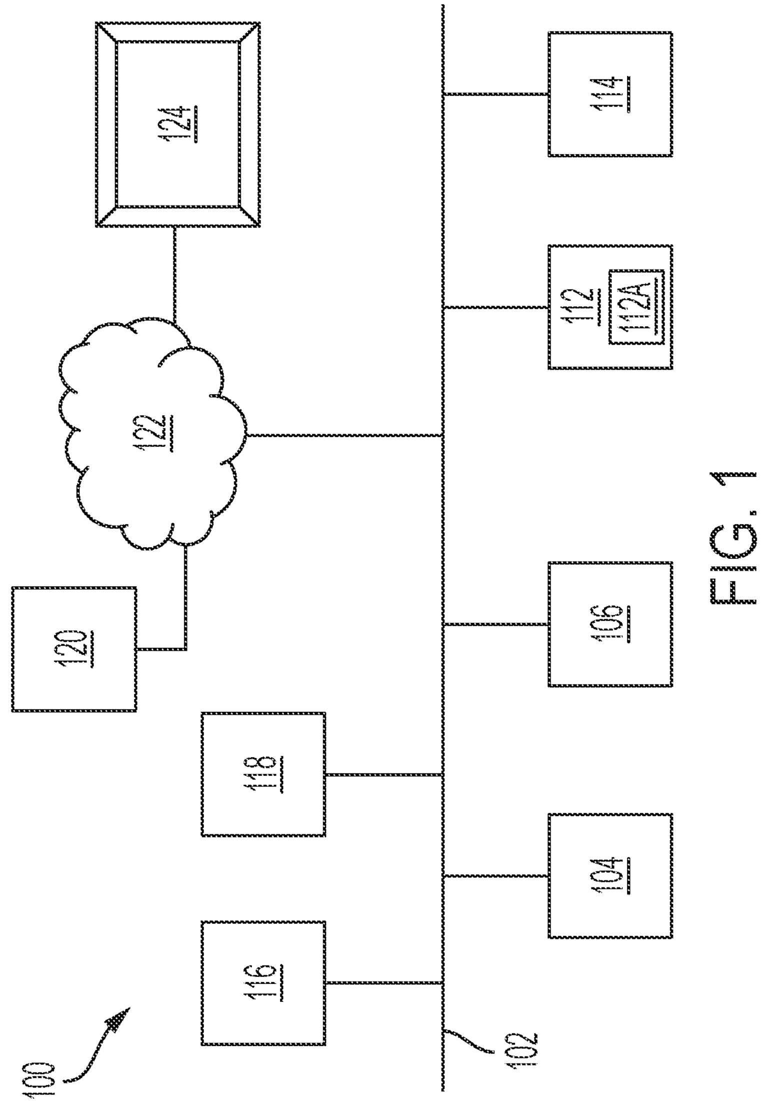
FIG. 1 schematically depicts an electronic document collaboration system, according to one or more embodiments shown and described herein.

Referring now to FIG. 1, an embodiment of an electronic document collaboration system 100 as described herein includes a communication path 102, one or more processors 104, a memory component 106, a unique identifier module 112, a comment security designation sub-module 112A of the unique identifier module 112, one or more data stores 114, a document access module 116, a network interface hardware 118, a network 122, a server 120, and a device 124, such as a computing device. The various components of the electronic document collaboration system 100 and the interaction thereof will be described in detail below.

While only one server 120 and one device 124 is illustrated in FIG. 1, the electronic document collaboration system 100 can comprise multiple servers containing one or more applications and/or computing devices. In some embodiments, the electronic document collaboration system 100 is implemented using a wide area network (WAN) or network 122, such as an intranet or the internet. The device 124 may include digital systems and other devices permitting connection to and navigation of the network 122. It is contemplated and within the scope of this disclosure that the device 124 may be a personal computer, a laptop device, a smart mobile device such as a smart phone or smart pad, or the like. Other electronic document collaboration system 100 variations allowing for communication between various geographically diverse components are possible. The lines depicted in FIG. 1 indicate communication rather than physical connections between the various components.

The electronic document collaboration system 100 comprises the communication path 102. The communication path 102 may be formed from any medium that is capable of transmitting a signal such as, for example, conductive wires, conductive traces, optical waveguides, or the like, or from a combination of mediums capable of transmitting signals. The communication path 102 communicatively couples the various components of the electronic document collaboration system 100. As used herein, the term "communicatively coupled" means that coupled components are capable of exchanging data signals with one another such as, for example, electrical signals via conductive medium, electromagnetic signals via air, optical signals via optical waveguides, and the like.

The electronic document collaboration system 100 of FIG. 1 also comprises the one or more processors 104. Each processor 104 can be any device capable of executing machine readable instructions. Accordingly, each processor 104 may be a controller, an integrated circuit, a microchip, a computer, or any other computing device. Each processor 104 is communicatively coupled to the other components of the electronic document collaboration system 100 by the communication path 102. Accordingly, the communication path 102 may communicatively couple any number of processors 104 with one another, and allow the modules coupled to the communication path 102 to operate in a distributed computing environment. Specifically, each of the modules can operate as a node that may send and/or receive data.

The illustrated electronic document collaboration system 100 further comprises the memory component 106 which is coupled to the communication path 102 and communicatively coupled to a processor 104 of the one or more processors 104. The memory component 106 may be a non-transitory computer readable medium or non-transitory computer readable memory and may be configured as a nonvolatile computer readable medium. The memory component 106 may comprise RAM, ROM, flash memories, hard drives, or any device capable of storing machine readable instructions such that the machine readable instructions can be accessed and executed by the processor 104. The machine readable instructions may comprise logic or algorithm(s) written in any programming language such as, for example, machine language that may be directly executed by the processor 104, or assembly language, object-oriented programming (OOP), scripting languages, microcode, etc., that may be compiled or assembled into machine readable instructions and stored on the memory component 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, as noted above, the electronic document collaboration system 100 comprises a display, such as a graphical user interface (GUI), on a screen of the device 124 for providing visual output such as, for example, information, graphical reports, messages, or a combination thereof. The display on the screen of the device 124 is coupled to the communication path 102 and communicatively coupled to the processor 104. Accordingly, the communication path 102 communicatively couples the display to other modules of the electronic document collaboration system 100. The display can comprise any medium capable of transmitting an optical output such as, for example, a cathode ray tube, light emitting diodes, a liquid crystal display, a plasma display, or the like. Additionally, it is noted that the display or the device 124 can comprise at least one of the processor 104 and the memory component 106. While the electronic document collaboration system 100 is illustrated as a single, integrated system in FIG. 1, in other embodiments, the systems can be independent systems.

The electronic document collaboration system 100 comprises the unique identifier module 112 configured to at least generate a unique identifier for a comment added to an electronic document 302 (FIG. 3) by a participant user, as will be described in greater detail further below. The comment security designation sub-module 112A of the unique identifier module 112 is configured to associate a security designation, as described in greater detail further below, with the unique identifier generated by the unique identifier module 112 and selected by the participant user. The document access module 116 is configured to provide the participant user and/or a collaborator group access to the electronic document 302 and the comments, which may be overlaid on the electronic document 302, and for which the participant user and/or the collaborator group have been granted access as described herein and in greater detail further below.

The unique identifier module 112, the comment security designation sub-module 112A, and the document access module 116 are coupled to the communication path 102 and communicatively coupled to the processor 104. As will be described in further detail below, the processor 104 may process the input signals received from the system modules and/or extract information from such signals.

Data stored and manipulated in the electronic document collaboration system 100 as described herein is utilized by the document access module 116, which is able to leverage a cloud computing-based network configuration such as the cloud. Thus, the document access module 116 may be configured to provide the document to entities and/or collaborator groups via a cloud network. The electronic document collaboration system 100 further includes the network interface hardware 118 for communicatively coupling the electronic document collaboration system 100 with a computer network such as network 122. The network interface hardware 118 is coupled to the communication path 102 such that the communication path 102 communicatively couples the network interface hardware 118 to other modules of the electronic document collaboration system 100. The network interface hardware 118 can be any device capable of transmitting and/or receiving data via a wireless network. Accordingly, the network interface hardware 118 can comprise a communication transceiver for sending and/or receiving data according to any wireless communication standard. For example, the network interface hardware 118 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 1, data from various applications running on device 124 can be provided from the device 124 to the electronic document collaboration system 100 via the network interface hardware 118. The device 124 can be any device having hardware (e.g., chipsets, processors, memory, etc.) for communicatively coupling with the network interface hardware 118 and a network 122. Specifically, the device 124 can comprise an input device having an antenna for communicating over one or more of the wireless computer networks described above.

The network 122 can comprise any wired and/or wireless network such as, for example, wide area networks, metropolitan area networks, the internet, an intranet, satellite networks, or the like. Accordingly, the network 122 can be utilized as a wireless access point by the device 124 to access one or more servers (e.g., a server 120). The server 120 and any additional servers generally comprise processors, memory, and chipset for delivering resources via the network 122. Resources can include providing, for example, processing, storage, software, and information from the server 120 to the electronic document collaboration system 100 via the network 122. Additionally, it is noted that the server 120 and any additional servers can share resources with one another over the network 122 such as, for example, via the wired portion of the network, the wireless portion of the network, or combinations thereof. Where used herein, "a first element, a second element, or combinations thereof" reference an "and/or" combination similar to use herein of "at least one of a first element or a second element."

Figure 2:
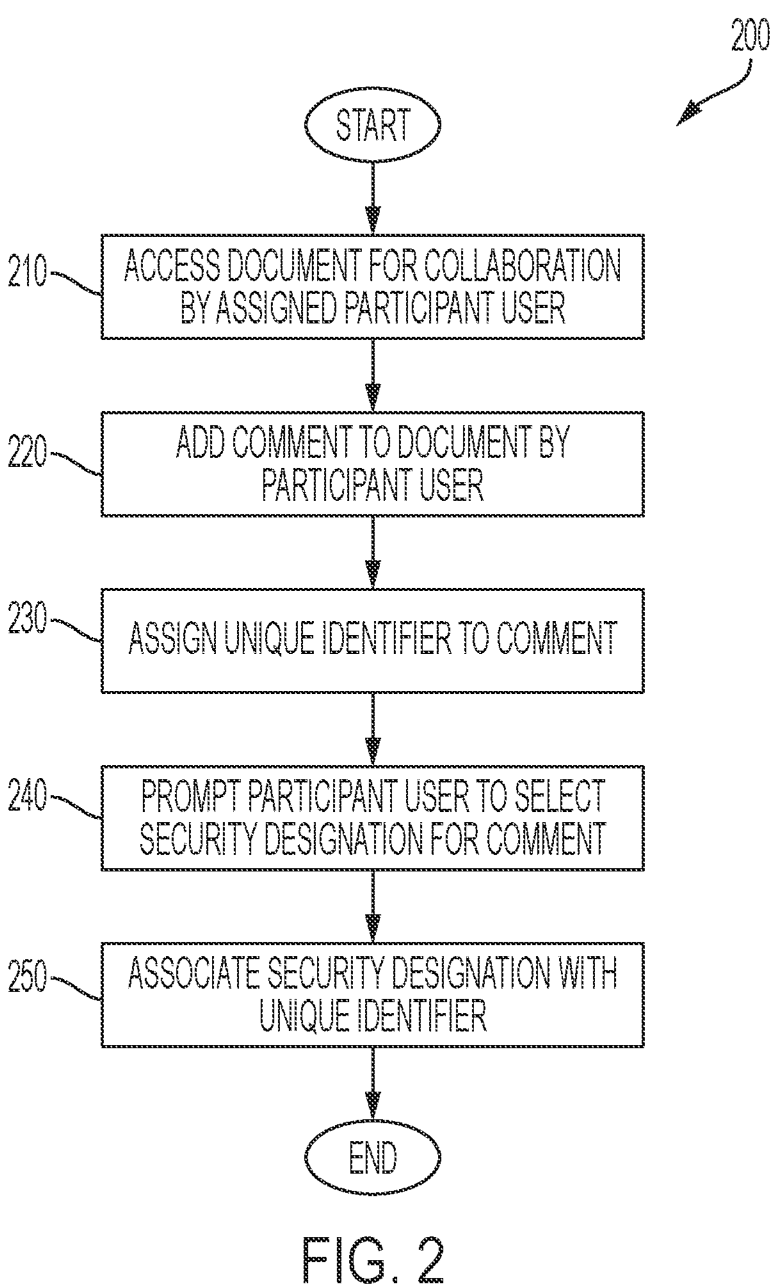
FIG. 2 depicts an illustrative flowchart of a computer-implemented method for collaborating on an electronic document utilizing the electronic document collaboration system of FIG. 1, according to one or more embodiments shown and described herein.

Referring to FIG. 2, an example process 200 of a computer-implemented method for collaborating on an electronic document 302 (FIG. 3) using the electronic document collaboration system 100 of FIG. 1 is depicted. In block 210, an electronic document 302 stored within the data store 114 of the electronic document collaboration system 100 may be accessed by a participant user, and the electronic document 302 may be caused to be displayed via the graphical user interface. In order to access the electronic document 302, the participant user may be assigned access rights to the electronic document 302. The access rights may grant the participant user a level of access related to the electronic document 302. For example, a participant user with access rights to the electronic document 302 of a first level may be capable of accessing, viewing, and/or editing the electronic document 302. Furthermore, in some embodiments, a participant user with access rights in the electronic document 302 of a second level higher than the first level may be capable of additional access rights to the electronic document, such as adding comments, as will be described in additional detail herein.

A participant user may be a participant user of a collaborator group, and the collaborator group may be one of one or more collaborator groups connected to the network 122 of the electronic document collaboration system 100. In these embodiments, each of the one or more collaborator groups may include one or more participant users. Furthermore, each of the one or more collaborator groups may be assigned to an entity of a plurality of entities.

In embodiments herein, one or more access rights in the electronic document 302 may be assigned to a particular entity of the plurality of entities, a particular collaborator group of the one or more collaborator groups, and/or a particular participant user within the collaborator group. For example, in some embodiments, one or more of the entities of the plurality of entities is assigned access rights in the electronic document 302. One or more selected collaborator groups assigned to an assigned entity, and each of the one or more participant users within each of the one or more selected collaborator groups, may be granted access rights in the electronic document 302.

Furthermore, it should be noted that the electronic document collaboration system 100 may be configured to assign different access rights in the electronic document 302 to different participant users. For example, a first participant user may be granted first access rights to the electronic document, which first access rights allow the first participant user to view, edit, and print the electronic document 302. In contrast, a second participant user may be granted access rights in the electronic document 302, which second access rights only allow the second participant user to view the electronic document 302, without providing the second participant user access rights to edit and/or print the electronic document 302. In these embodiments, each of the one or more participant users may be assigned different levels of access rights within the electronic document 302. Accordingly, it should be understood that the access rights in the electronic system assigned by the electronic document collaboration system 100 may be customized to meet the needs of particular entities, collaborator groups, and/or participant users. For example, a collaborator group working on a highly sensitive electronic document 302 may have stricter access rights than a group working on a less sensitive electronic document 302. Similarly, a participant user who is new to the electronic document collaboration system 100 may be granted limited access rights until they have demonstrated their proficiency with the electronic document collaboration system 100.

In the embodiments described herein, the electronic document collaboration system 100 may be configured to provide a notification to the participant user when the participant user is granted access rights in the electronic document 302. For example, the electronic document collaboration system 100 may automatically send an email notification to the participant user when the participant user is granted access rights in the electronic document 302. In these embodiments, the email notification may include a link to the electronic document 302 and/or provide instructions on how to access the electronic document 302. Similarly, the electronic document collaboration system 100 may notify the participant user via text message, a mobile application, a notification system, or any other similar notification mechanism that may indicate to the participant user that access rights have been granted in the electronic document 302.

In some embodiments, the electronic document collaboration system 100 may be further configured to restrict access to the electronic document 302 to one or more collaborator groups across one or more entities and/or one or more participant users that have not received access rights to the electronic document 302. For example, in these embodiments, when a participant user without access rights in the electronic document 302 attempts to access the electronic document, the electronic document collaboration system 100 may deny access to the participant user and display an appropriate error message that indicates to the participant user that the participant user does not have the requisite access rights in the electronic document 302. As will be greater in greater detail below with respect to FIGS. 2-5, the electronic document collaboration system 100 may be further configured to restrict access to one or more comments within the electronic document 302 to one or more collaborator groups across one or more entities and/or one or more participant users that have not received access rights to comment on and/or view comments of the electronic document 302 though may have access rights to view the electronic document 302.

The electronic document collaboration system 100 may be further configured to review the electronic document 302 for sensitive information prior to granting a participant user access rights in the electronic document 302. For example, the electronic document collaboration system 100 may utilize natural language processing, artificial intelligence, machine learning, and other similar processing techniques to scan the electronic document for trade information, account information, personally identifiable information (e.g., information which may be used to identify a particular individual), or other similar sensitive information contained within the electronic document. In the event the electronic document collaboration system 100 identifies sensitive information, the system may provide a notification to a participant user (e.g. an administrator or other similar user) prior to granting access rights to the electronic document 302. In some embodiments, the electronic document collaboration system 100 may be further configured to automatically redact sensitive information prior to granting access rights to the electronic document 302.

Referring again to FIG. 2, in block 220 of the process 200, a participant user that has been granted access rights to the electronic document 302 by the electronic document collaboration system 100 may add a comment to the electronic document 302. In these embodiments, the participant user may add a comment to the electronic document 302 in a variety of ways. For example, the participant user may add a text-based comment directly into the electronic document 302, which may appear in the electronic document 302 as added within a comment overlay box (e.g., comment box 304 of FIG. 3, described in greater detail further below) highlighting the specific section of the document to which the comment applies. Furthermore, the comment may include a drawing comment or a markup comment, which may be generated by a drawing tool provided by the electronic document collaboration system 100. The drawing comment or markup comment may be useful for highlighting specific areas of the electronic document or making visual suggestions for edits. For example, the drawing comment or markup comment may be utilized to select an area of the electronic document that should be deleted and/or edited. It should be understood that the various comments described herein are for illustrative purposes only, and the electronic document collaboration system 100 may allow for any form of commentary (e.g., audio, visual, and/or other suitable commentary forms) without departing from the scope of the present disclosure.

In block 230 of the process 200, a unique identifier is assigned to the comment when the comment is added to the document by the participant user. In these embodiments, the unique identifier may be associated with comment information including various parameters, such as a name of the participant user adding the comment, a timestamp of when the comment was created (that may include, for example, day, month, year, and/or time information), a written description of the comment, one or more visibility restraints with the comment, a resolution status of the comment, or any other suitable comment information. The unique identifier is unique to the comment to which the unique identifier is associated.

In these embodiments, the unique identifier may be generated utilizing a database sequence method. For example, the data store 114 may allow for the automatic generation of unique values, which may be used to generate the unique identifiers discussed herein. By utilizing a database sequence method, the electronic document collaboration system 100 may ensure that concurrent unique identifiers are not applied to the same comment, thereby ensuring the privacy and security of comments created within the electronic document 302.

Once the unique identifier is generated, the unique identifier module 112 of the electronic document collaboration system 100 may store the unique identifier in the data store 114 such that the electronic document collaboration system 100 is able to retrieve the comment and associated information. The unique identifier module 112 may further associate the unique identifier with the comment, such that the unique identifier is connected to the comment, even in instances when the comment is moved or deleted. In some embodiments, the unique identifier may be displayed within the comment in the electronic document 302, either as a separate label or as part of the comment itself. By displaying the unique identifier with the comment, the participant user may easily identify individual comments and refer to the comment specifically when collaborating on the electronic document 302.

In block 240 of the process 200, the participant user that adds the comment may be prompted to select a security designation for the comment in response to the comment being added to the electronic document 302. In these embodiments, the security designation may include a selection of one or more collaborator groups, one or more entities, and/or one or more participant users, such as within the one or more collaborator groups or the one or more entities, to which to assign access rights to the comment.

In operation, the participant user may be prompted to select the security designation from a defined list of options, which options may include one or more entities of the plurality of entities, one or more collaborator groups within the one or more entities, and or the one or more participant users within the one or more collaborator groups or the one or more entities. The participant user may select from the list of options the entities, collaborator groups, and/or participant users that may be granted access rights in the comment. Furthermore, it should be noted that the participant user that adds the comment to the electronic document 302 may opt to select none of the entities, collaborator groups, and/or participant users, such that the comment is only accessible (e.g., viewable, editable, or otherwise) to the participant user that adds the comment to the electronic document, and that the participant user may modify access rights assigned to the comment, as will be described in greater detail further below.

In block 250 of the process 200, once the participant user has selected the security designation for the comment added to the electronic document 302, the security designation may be associated with the unique identifier of the comment. In these embodiments, the comment security designation sub-module 112A may be configured to assign the selected security designation to the unique identifier of the comment, such that the security designation may be enforced by the document access module 116. By way of example, and not as a limitation, the document access module 116 may confirm that only participant users which have received access rights in the electronic document 302 (e.g., participant users associated with the security designation) may access the comment added by the participant user and associated with the unique identifier, as well as any responsive comments associated with the added comment as described in greater detail below.

In the embodiments described herein, the participant user that adds the comment to the electronic document may further define a level of access rights in the comment which are granted to particular entities, collaborators, and/or participant users within the security designation. For example, when the participant user adds the comment to the electronic document, the participant user may be further prompted to define the access rights granted in accordance with the selected security designation. For example, the participant user that adds the comment to the electronic document may grant access rights that may allow for the one or more collaborator groups and/or the one or more participant users to view the comment, edit the comment, reply to the comment, delete the comment, and/or resolve the comment.

Furthermore, it should be understood that, in some embodiments, the participant user that adds the comment to the electronic document 302 may select multiple security designations, with each of the multiple security designations granting varying level of access rights to the one or more collaborator groups and/or the one or more participants associated with the multiple selected security designation. As a non-limiting example, the participant user may select a first group of collaborators of one or more collaborator groups that are given a first level of access rights to the comment, which may include the ability to view, edit, and resolve the comment. The participant user may further select a second group of collaborators of one or more collaborator groups that are given a second level of access rights to the comments, which may only include the ability to view the comment. It should be understood that examples provided herein are non-limiting in nature, and the participant user that adds the comment to the electronic document may select any number of security designations having any number of access rights to the comment without departing from the scope of the present disclosure.

It should be further appreciated that the electronic document collaboration system 100 may be configured to modify the security designation for the comment. For example, in some embodiments, the electronic document collaboration system 100 may be configured to modify the security designation for the comment to allow additional entities, collaborator groups, and/or participant users to receive access rights to the comment. Furthermore, in some embodiments, the electronic document collaboration system 100 may be configured to automatically modify the security designation selected by the participant user that adds the comment to the electronic document. For example, in the event the participant user includes sensitive information within the comment that should not be shared with specific entities, collaborator groups, and/or participant users, the electronic document collaboration system 100 may automatically modify the security designation in the event the participant user that adds the comment to the electronic document inadvertently selects a security designation associated with one of the specific entities, collaborator groups, and/or participant users. Alternatively or additionally, the electronic document collaboration system 100 may be configured to provide notification to the participant user of the automated modification or recommendation for said modification based on restricted rights.

Referring again to FIG. 2, when the security designation is associated with the unique identifier, as depicted at block 250, the electronic document collaboration system 100 may further be configured to provide a notification to designated parties of the security designation, including the one or more entities, collaborator groups, and/or one or more participant users included in the selected security designation, that access rights have been granted to the comment to the designated parties. As has been provided herein, the electronic document collaboration system 100 may be configured to notify the one or more entities, collaborator groups, and/or one or more participant users via email, text message, mobile application, notification system, or any other similar notification mechanism. In these embodiments, the notification may further include the level of access rights granted to the one or more participant users associated with the security designation.

Once the one or more participant users associated with the security designation have been notified that access rights have been granted in the comment, the one or more participant users associated with the security designation may access the comment added to the electronic document 302. In embodiments, the access rights may give the one or more participant users associated with the security designation the ability to manipulate and/or add to the comment and/or respond to the comment with one or more responsive comments. For example, the electronic document collaboration system 100 may be configured to add one or more responsive comments by the one or more participant users associated with the security designation, as will be described in additional detail herein. In some embodiments, additional notifications may be provided to the participant user that adds the comment to the electronic document 302 and/or the one or more participant users associated with security designation when a responsive comment is added to the comment and/or the comment is otherwise modified (e.g. closed, resolved, re-opened, etc.).

Figure 3:
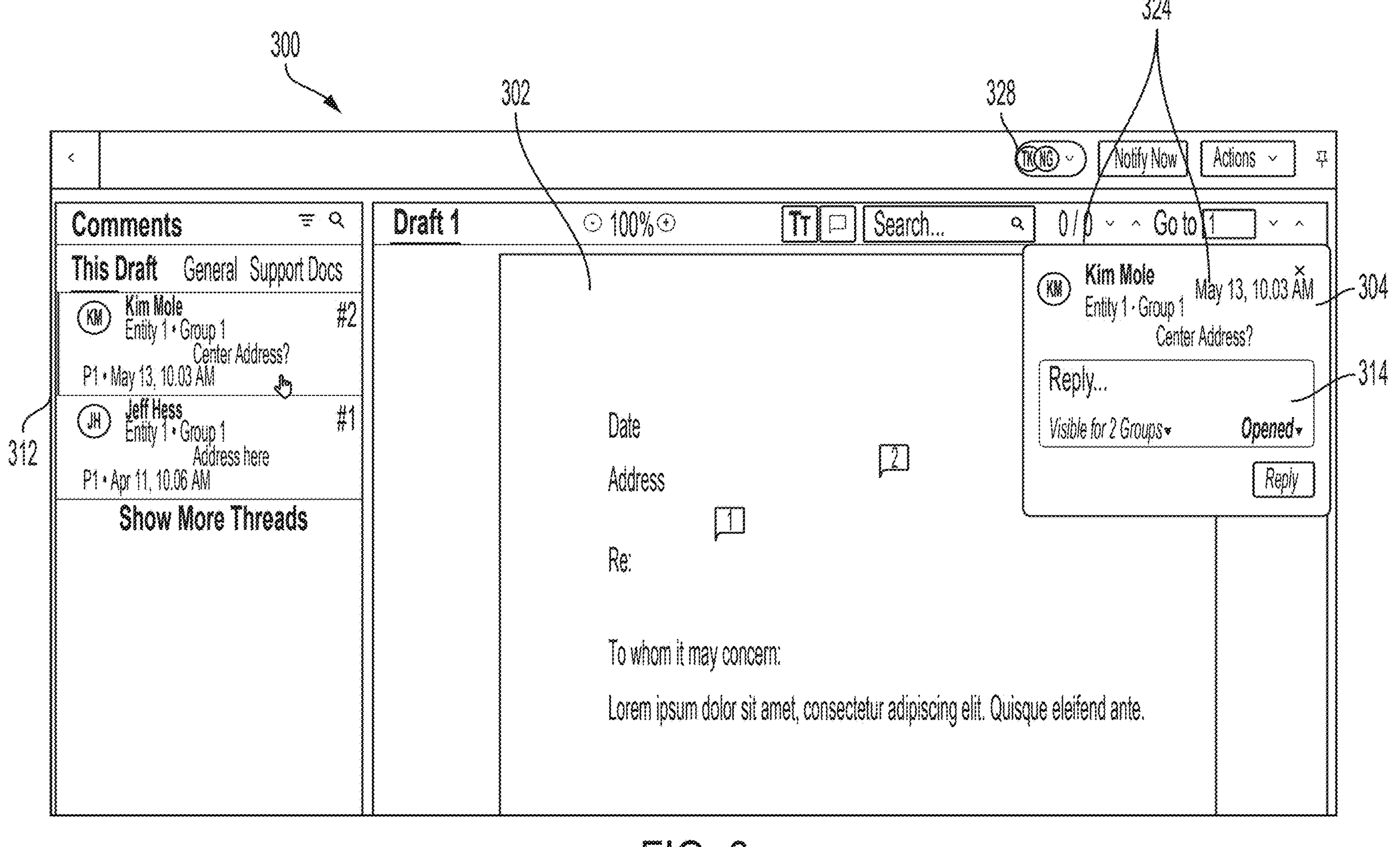
FIG. 3 depicts an exemplary user interface of the electronic document collaboration system of FIG. 1 for adding a comment to an electronic document, according to one or more embodiments shown and described herein.

Referring now to FIG. 3, an embodiment of a user interface 300 of the electronic document collaboration system 100 is depicted. In embodiments, the electronic document collaboration system 100 may be configured to allow for participant users with access rights in the electronic document 302 to view the electronic document 302 via the user interface 300.

As further depicted in FIG. 3, a participant user with requisite access rights in the electronic document 302 may add a comment via a comment box 304 to the electronic document 302. In FIG. 3, a first comment by Jeff Hess as an example participant user has been added and is indicated in the electronic document 302 at a box location including number 1 as a comment flag. As has been described herein, the electronic document collaboration system 100 may be configured to automatically assign a unique identifier to the comment when the comment is added to the electronic document 302, such as via the comment box 304. In embodiments, the unique identifier and/or associated comment information 324 may be displayed in the comment box 304. For example, as illustrate in FIG. 3, the comment information 324 for a comment or one or more responsive comments associated with the unique identifier may include a name of the participant user that adds the comment via the comment box 304 to the electronic document 302 and a timestamp of when the participant user adds the comment.

The comment box 304 may further include a reply field 314 for one or more responsive comments, such that the electronic document collaboration system 100 may be configured to add one or more responsive comments from a participant user having access rights in the comment to the comment box 304. In embodiments, the reply field 314 may further indicate a status of the comment and associated comment chain, such by indicating via the comment box 304 that a comment is open, closed, resolved, or any other similar status designation. For example, as depicted in FIG. 3, the reply field 314 indicates that the comment and associated comment chain is "open."

The reply field 314 may further indicate assigned visibility to the one or more collaborator groups and/or the one or more participant users with access rights in the comment as portrayed in comment box 304. For example, as depicted in the embodiment of FIG. 3, the reply field 314 indicates that the comment box 304 is "[v]isible for [two] groups." The electronic document collaboration system 100 may be configured to provide a list of the collaborator groups and/or one or more participant users with access rights to the comment and comment chain when prompted by the participant user. For example, the reply field 314 may include a graphical element, such as a drop down menu, that, when selected by the participant user, provides a list of the one or more collaborator groups and/or the one or more participant users with access rights in the comment and comment chain. The comment access rights will be described in additional detail herein with reference to FIG. 4.

As further depicted in FIG. 3, the user interface 300 may further include a comment pane 312. In these embodiments, the comment pane 312 may be positioned to a side of the electronic document 302, such that the electronic document collaboration system 100 is configured to display the comments associated with the electronic document 302 and correspondingly display the electronic document 302 to a participant user. To aid a participant user in identifying and searching through various comments, each comment received via comment box 304 and displayed in the comment pane 312 may be displayed with the comment information 324 associated with the received comment or responsive comment of a comment chain. For example, as shown in FIG. 3, each comment displayed in the comment pane 312 further includes the name of the participant user that added the associated comment or responsive comment via comment box 304 to the electronic document 302, a timestamp of when the comment or responsive comment was added to the electronic document 302, an indication of entity with which the participant user is associated (e.g., "Entity 1"), and an indication of the collaborator group with which the participant user is associated (e.g., "Group 1). A responsive comment as a second comment by Kim Mole as a participant user also associated with Entity 1, Group 1 has been added and is indicated in the electronic document 302 at a box location including number 2 as a comment flag.

In embodiments, each comment and responsive comment of a comment chain with comment information 324 displayed in the comment pane 312 may be stored in the data store 114 of the electronic document collaboration system 100 and linked to the associated unique identifier that is also stored in the data store 114. A participant user with access to the electronic document 302 can view a history of comments (e.g., and comment chains) associated with the electronic document 302 and/or past versions of the electronic document 302. For example, as depicted in FIG. 3, the comment pane 312 may display a comment chain associated with a particular version of the electronic document 302, such as a present draft of the electronic document 302. In embodiments, the comment pane 312 may be further configured to display comments generally related to the electronic document 302 (e.g., comments that are associated with another version of the electronic document 302), comments related to supporting documents of the electronic document 302, and/or comments relating to past (e.g., historical) versions of the electronic document 302.

Referring still to FIG. 3, the user interface 300 may further include a selected user indication 328, which may depict the one or more collaborator groups including one or more participant users that have been granted access rights to collaborate on the electronic document 302, as will be described in additional detail with reference to FIG. 5.

Figure 4:
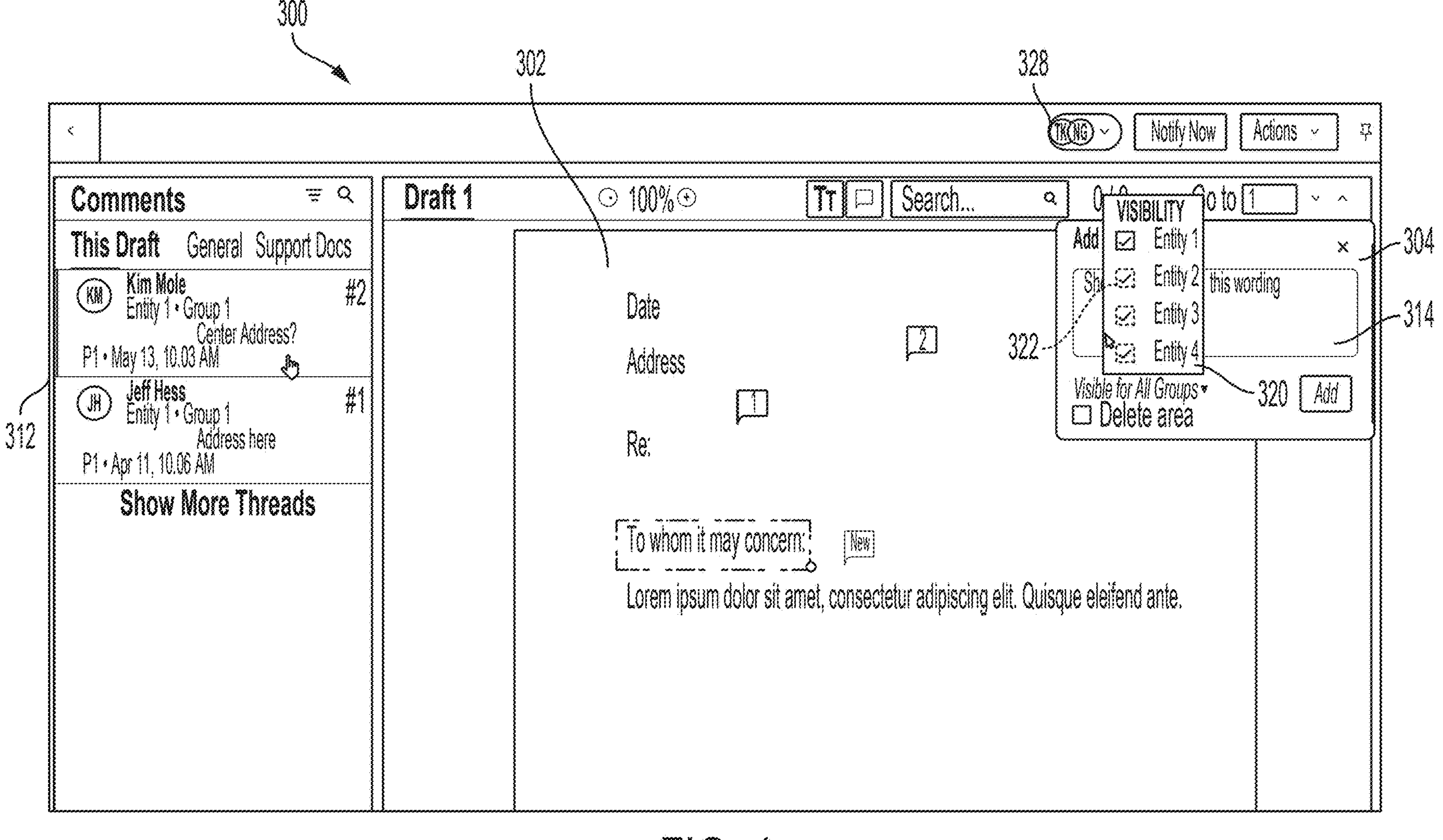
FIG. 4 depicts an exemplary user interface of the electronic document collaboration system of FIG. 1 for assigning access rights to a comment, according to one or more embodiments shown and described herein.

Referring now to FIG. 4, access rights 320 to assign visibility to a comment and/or comment chain to one or more entities of the plurality of entities may be selected and/or modified. As shown in FIG. 4, when a comment/responsive comment via the comment box 304 is added to the electronic document 302 by a participant user, the participant user may be prompted by the electronic document collaboration system 100 to assign access rights 320 to assign visibility to a comment and/or comment chain to one or more entities of the plurality of entities prior to adding the comment via the comment box 304 to the electronic document 302. In these embodiments, when the participant user adds the comment/responsive comment via the comment box 304 to the electronic document 302, the electronic document collaboration system 100 may present the user with a graphical element that may allow the user to configure access rights in the comment. For example, as depicted in FIG. 4, the graphical element presented to the user may include an "add" button provided in the comment box 304. When the user selects the "add" button, the electronic document collaboration system 100 may be configured to automatically provide a drop down list of the access rights 320 in the comment box 304, and prompt the participant user to select the one or more collaborator groups and/or one or more participant users that should be assigned access rights 320 in the comment box 304, and/or the participant user may access the visibility list via a Visible for All Groups drop down menu selection.

As further depicted in FIG. 4, the participant user may utilize an access rights graphical element 322 as displayed in the entity listing to select the entity to which to assign access rights 320 that assign visibility to a comment and/or comment chain to the selected one or more entities of the plurality of entities. For example, the user interface 300 illustrated in FIG. 4 may prompt the participant user to elect an entity such as one or more of Entity 1, Entity 2, Entity 3, and Entity 4 to assign access rights 320 for visibility to the comment and comment chain. In embodiments, each of the collaborator groups and/or participant users identified in the drop down list may be associated with an access rights graphical element 322. The participant user may then assign access rights 320 for a comment/comment chain to an entity, collaborator group, and/or participant user by selecting one or more entities via the access rights graphical element 322 associated with a particular entity, collaborator group, and/or participant user. Thus, the electronic document collaboration system 100 may be configured to at least one of (i) assign one or more access rights 320 to one or more entities of the plurality of entities to the electronic document in response to receiving a selection input of the one or more entities from the participant user via an associated access rights graphical element 322, or (ii) assign one or more access rights 320 to the one or more collaborator groups of the one or more entities of the plurality of entities to the electronic document in response to receiving a selection input of the one or more collaborator groups from the participant user via an invite collaborators graphical element 326 (as shown in FIG. 5, which is described in greater detail below).

For example, the participant user may elect Entity 1 to assign access rights 320 for visibility to the comment and comment chain, as is depicted in FIG. 4. Accordingly, when Entity 1 is selected, Entity 1 participant users may receive a notification from the electronic document collaboration system 100 that informs the Entity 1 participant users that they have been granted access rights 320 in the comment. As illustrated in the comment pane 312 of FIG. 4, Kim Mole and Jeff Hess may each be Entity 1 participant users, such that Kim Mole and Jeff Hess each receive a notification that they have been granted access rights 320 in the comment.

As has been described herein, the notification provided to the Entity 1 participant users may include a link, or other similar instructions, that allow the Entity 1 users to access the electronic document 220. Because the Entity 1 participant users have been granted access rights 320 in the comments added to the electronic document 220, when any Entity 1 participant user accesses the electronic document 220, the Entity 1 participant user may view and/or respond to the comments and comment chain. Accordingly, it should be understood that an Entity 1 participant user accessing the electronic document collaboration system 100 would be able to view the user interface 300 as depicted in FIG. 4 (e.g., with comments and comment chain visible).

In contrast, a participant user associated with an unelected entity (e.g., Entity 2, Entity 3, or Entity 4) that has not been assigned access rights 320 in the comment and/or comment chain may not be able to view the comment and/or comment chain when accessing the electronic document 220. For example, an Entity 2 participant user may be able to access the electronic document collaboration system 100, but may not have access rights 320 in the comments and comment chain associated with the electronic document 220. Accordingly, when the Entity 2 participant user accesses the electronic document collaboration system 100, the user interface 300 may only display the electronic document 220 without displaying any comments and/or the comment chain. In the event the Entity 2 participant user requests that the electronic document collaboration system 100 display the comments and comment chain associated with the electronic document 220, the electronic document collaboration system 100 may be configured to automatically reject such a request until the Entity 2 participant user is granted access rights 320.

Thus, the electronic document collaboration system 100 may be configured to (i) receive a request to access the electronic document 220 from one or more participant users of the one or more collaborator groups of the one or more entities of the plurality of entities assigned access rights to the electronic document 220, (ii) display the electronic document 220 and the comment via the graphical user interface to the one or more participant users in response to the one or more participant users being assigned access rights to the comment, and (iii) display the electronic document 220 without the comment via the graphical user interface to the one or more participant users in response to the one or more participant users not being assigned access rights to the comment.

Figure 5:
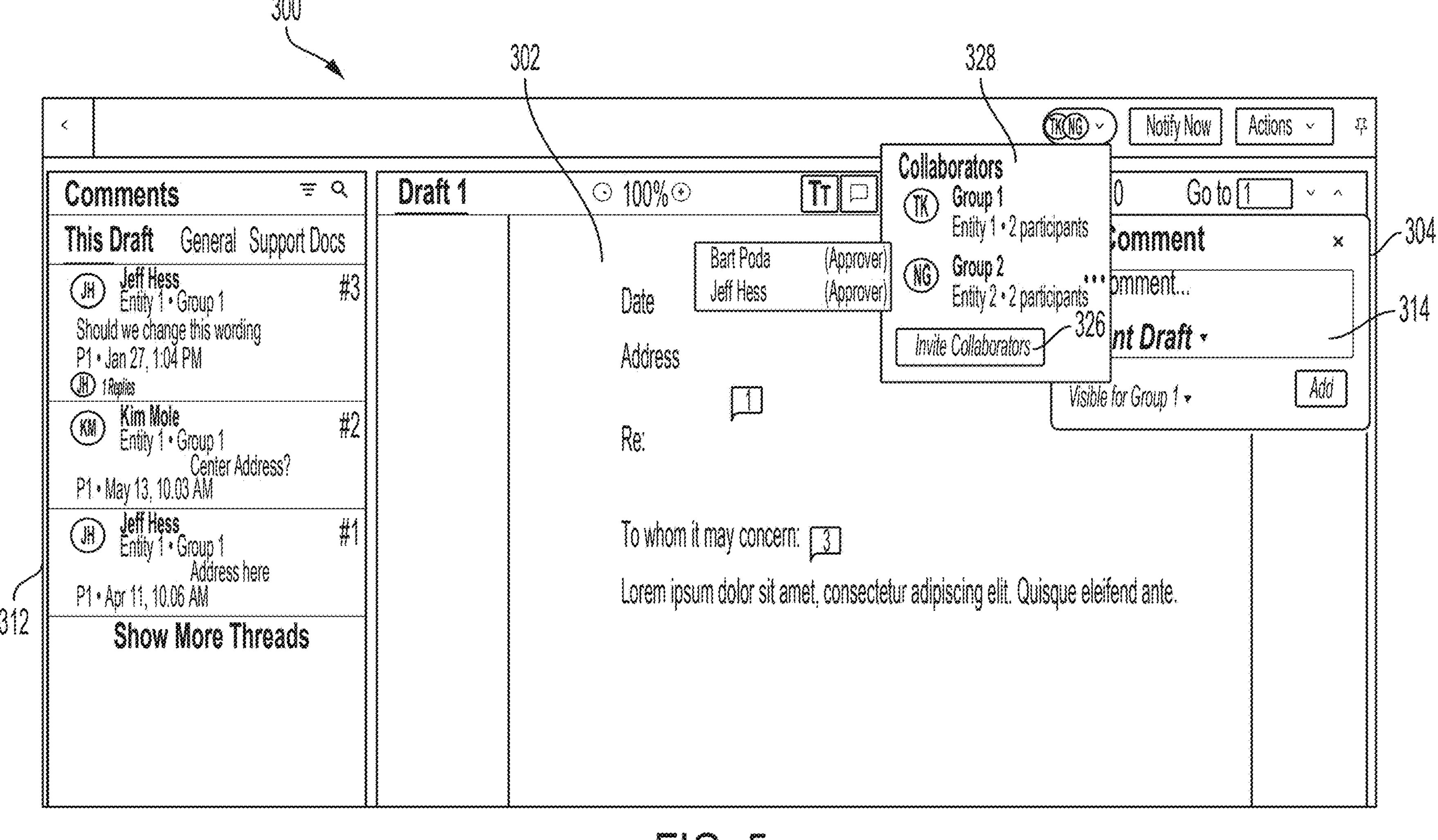
FIG. 5 depicts an exemplary user interface of the electronic document collaboration system of FIG. 1 for identifying one or more collaborator groups with access rights to a comment, according to one or more embodiments shown and described herein.

Referring still to FIG. 5, in some embodiments, once the access rights 320 have been assigned to the comment box 304, the electronic document collaboration system 100 may be configured to automatically close the comment box 304 and display the associated comment and comment information 324 of the comment box 304 in the comment pane 312. The associated comment may then be accessed via the comment pane 312 by any entities, collaborator groups, and/or participant users with access rights 320 in the associated comment chain. In FIG. 4, another responsive comment as a third comment by Jeff Hess (shown in the comment pane 312 in FIG. 5) is being added and is indicated in the electronic document 302 at a box location including "New" as a comment flag, which changes to number 3 in FIG. 5 after the associated comment box 304 is closed. The third comment highlights an area surrounding the verbiage "To whom it may concern" via a comment overlay box shown in dashed lines and with a comment as to whether the verbiage should be changed.

Referring now to FIG. 5, the user interface 300 may be further configured to allow a participant user to view and/or select additional entities, collaborator, groups and/or participant users to receive access rights 320 in the electronic document 302, such that the additional entities, collaborator groups, and/or participant users may collaborate on the electronic document.

For example, as depicted in FIG. 5, the user interface 300 may include a selected user indication 328, which may indicate the entities, collaborator groups, and/or participant users that have access rights 320 to collaborate on a comment chain (e.g., view, edit, further comment, etc.) on the electronic document 302. In embodiments, when a participant user selects the selected user indication 328, the electronic document collaboration system 100 may display a drop down list that identifies each of the entities, collaborator groups, and/or participant users with access rights 320 in the electronic document 302. For example, as shown in FIG. 5, the selected user indication 328 is shown to include two collaborator groups, such as a first collaborator group 1 identified as "TK" and a second collaborator group 2 identified as "NG." Group 1 is associated with Entity 1 and includes two participant users of Entity 1, and Group 2 is associated with Entity 2 and includes two other participate users of Entity 2.

In embodiments, the drop down list provided by the electronic document collaboration system 100 may thus identify the number of participant users in each of the collaborator groups identified in the selected user indication 328. In some embodiments, the user interface 300 may further allow for a participant user to select the collaborator groups listed in the selected user indication 328 via an associated icon, for example (such as "NG" in FIG. 5), such that the participant user may view the specific participant users associated with each of the collaborator groups.

As further illustrated in FIG. 5, the selected user indication 328 may further include an invite collaborators graphical element 326, such as an invite collaborators button. Selection of the invite collaborators graphical element 326 may allow a participant user to be presented with a list from which to select and invite additional entities, collaborator groups, and/or participant users to collaborate on the electronic document 302 by providing access rights 320 in the electronic document 302 to the additional entities, collaborator groups, and/or participant users. For example, when a participant user selects the invite collaborators graphical element 326, the electronic document collaboration system 100 may be configured to display a list of entities, collaborator groups, and/or participant users, which may be selected by the participant user to allow for comment collaboration with respect to a comment chain of the electronic document 302. In these embodiments, the list of entities, collaborator groups, and/or participant users provided by the electronic document collaboration system 100 may include a list of entities, collaborator groups, and/or participant users stored in the data store 114 of the electronic document collaboration system 100. However, in other embodiments, the participant user may further elect to utilize the invite collaborators graphical element 326 to extend access rights 320 to entities, collaborator groups, and/or participant users that are not associated with the electronic document collaboration system 100. For example, the participant user may be prompted to provide an email address for an entity, collaborator group, and/or participant user. In embodiments, the additional collaborators invited to collaborate on the electronic document 302 may receive an electronic link, or other similar instructions, which may allow access to the electronic document 302 for comment collaboration.

In embodiments, the electronic document collaboration system and methods as described herein assist to significantly ease collaboration with respect to comments on electronic documents between multiple entities, collaborator groups, and/or participant users and further aid in providing enhanced security features for users collaborating on electronic documents. As a non-limiting example, participant users associated with a particular collaborator group may restrict access rights in comments added to an electronic document that contain sensitive information to ensure that the comments are only accessible to other participant users associated with the particular collaborator group. As a result, multiple collaborator groups may be able to collaborate on the same electronic document simultaneously without risk of sharing certain information, such as, for example, sensitive information, with other collaborator groups associated with the electronic document. Furthermore, the electronic document collaboration system may allow for modification of security designations of comments added to the electronic document, such that comments added to the electronic document may be quickly and easily shared with other entities, collaborator groups, and/or participant users when desired. Accordingly, it should be appreciated that the electronic document collaboration system described herein provides a secure and efficient way to collaborate on electronic documents while ensuring privacy, confidentially, and access control for all parties.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

ASPECTS LISTING

Aspect 1. An electronic document collaboration system may include a processor, a memory component communicatively coupled to the processor, and one or more machine readable instructions stored in the memory component. The one or more machine readable instructions cause the electronic document collaboration system to perform at least the following when executed by the processor: access an electronic document in response to receiving input via a graphical user interface from a participant user of a collaborator group of one or more collaborator groups assigned to an entity of a plurality of entities, wherein said collaborator group and said entity are assigned access rights to the electronic document, cause the electronic document to be displayed via the graphical user interface, add a comment to the electronic document via an entry by the participant user into the electronic document, assign the comment a unique identifier, prompt the participant user to select a security designation for the comment in response to the comment being added to the electronic document, and associate the security designation with the unique identifier of the comment. The security designation comprises a selection of one or more collaborator groups of one or more entities of the plurality of entities to which to assign access rights to the comment, each group including one or more participant users.

Aspect 2. The electronic document collaboration system of Aspect 1, further including one or more machine readable instructions that cause the electronic document collaboration system to perform at least the following when executed by the processor: display the comment on the graphical user interface based on the security designation.

Aspect 3. The electronic document collaboration system of Aspect 1 or Aspect 2, further including machine readable instructions that cause the electronic document collaboration system to perform at least one of the following when executed by the processor: assign one or more access rights to one or more entities of the plurality of entities to the electronic document in response to receiving a selection input of the one or more entities from the participant user via an associated access rights graphical element, or assign one or more access rights to the one or more collaborator groups of the one or more entities of the plurality of entities to the electronic document in response to receiving a selection input of the one or more collaborator groups from the participant user via an associated invite collaborators graphical element.

Aspect 4. The electronic document collaboration system of any of Aspect 1 to Aspect 3, further including one or more machine readable instructions that cause the electronic document collaboration system to perform at least the following when executed by the processor: modify the security designation for the comment, and display the comment on the graphical user interface based on the security designation as modified.

Aspect 5. The electronic document collaboration system of any of Aspect 1 to Aspect 4, further including one or more machine readable instructions that cause the electronic document collaboration system to perform at least one of the following when executed by the processor: receive a selection to resolve the comment, re-open the comment after resolution, close the comment, or re-open the comment after closure.

Aspect 6. The electronic document collaboration system of any of Aspect 1 to Aspect 5, further including one or more machine readable instructions that cause the electronic document collaboration system to perform at least the following when executed by the processor: add one or more responsive comments to the comment by at least one of the participant user, or one or more participant users associated with the security designation.

Aspect 7. The electronic document collaboration system of any of Aspect 1 to Aspect 6, further including one or more machine readable instructions that cause the electronic document collaboration system to perform at least the following when executed by the processor: receive a request to access the electronic document from one or more participant users of the one or more collaborator groups of the one or more entities of the plurality of entities assigned access rights to the electronic document, display the electronic document and the comment via the graphical user interface to the one or more participant users in response to the one or more participant users being assigned access rights to the comment, and display the electronic document without the comment via the graphical user interface to the one or more participant users in response to the one or more participant users not being assigned access rights to the comment.

Aspect 8. The electronic document collaboration system of any of Aspect 1 to Aspect 7, further including select an area of the electronic document to which to add the comment via a comment overlay box machine readable instructions that cause the electronic document collaboration system to perform at least one of the following when executed by the processor: select an area of the electronic document to which to add the comment via a comment overlay box, or select an area of the electronic document to mark as deleted upon selection of a delete area icon as the comment.

Aspect 9. The electronic document collaboration system of any of Aspect 1 to Aspect 8, wherein the unique identifier is associated with comment information comprising at least one of: a name of the participant user adding the comment, a timestamp of when the comment was created, a written description of the comment, one or more visibility restraints with the comment, or a resolution status of the comment.

Aspect 10. A computer-implemented method for collaborating on an electronic document, the computer-implemented method including: accessing the electronic document in response to receiving input via a graphical user interface from a participant user of a collaborator group of one or more collaborator groups assigned to an entity of a plurality of entities, wherein said collaborator group and said entity are assigned access rights to the electronic document, causing the electronic document to be displayed via the graphical user interface, adding a comment to the electronic document via an entry by the participant user into the electronic document, assigning the comment a unique identifier, prompting the participant user to select a security designation for the comment in response to the comment being added to the electronic document, wherein the security designation comprises a selection of one or more collaborator groups of one or more entities of the plurality of entities to which to assign access rights to the comment, each group including one or more participant users, and associating the security designation with the unique identifier of the comment.

Aspect 11. The computer-implemented method of Aspect 10, further including displaying the comment on the graphical user interface based on the security designation.

Aspect 12. The computer-implemented method of Aspect 10 or Aspect 11, further including at least one of: assigning one or more access rights to one or more entities of the plurality of entities to the electronic document in response to receiving a selection input of the one or more entities from a the participant user via an associated access rights graphical element, or assigning one or more access rights to the one or more collaborator groups of the one or more entities of the plurality of entities to the electronic document in response to receiving a selection input of the one or more collaborator groups from the participant user via an associated invite collaborators graphical element.

Aspect 13. The computer-implemented method of any of Aspect 10 to Aspect 12, further including modifying the security designation for the comment, and displaying the comment on the graphical user interface based on the security designation as modified.

Aspect 14. The computer-implemented method of any of Aspect 10 to Aspect 13, further including at least one of: resolving the comment, re-opening the comment after resolution, closing the comment, or re-opening the comment after closure.

Aspect 15. The computer-implemented method of any of Aspect 10 to Aspect 14, further including at least one of: adding one or more responsive comments to the comment by the participant user, or one or more participant users associated with the security designation.

Aspect 16. The computer-implemented method of any of Aspect 10 to Aspect 15, further including receiving a request to access the electronic document from one or more participant users of the one or more collaborator groups of the one or more entities of the plurality of entities assigned access rights to the electronic document, displaying the electronic document and the comment via the graphical user interface to the one or more participant users in response to the one or more participant users being assigned access rights to the comment, and displaying the electronic document without the comment via the graphical user interface to the one or more participant users in response to the one or more participant users not being assigned access rights to the comment.

Aspect 17. The computer-implemented method of any of Aspect 10 to Aspect 16, further including at least one of: (i) selecting an area of the electronic document to which to add the comment via a comment overlay box, or (ii) selecting an area of the electronic document to mark as deleted upon selection of a delete area icon as the comment.

Aspect 18. The computer-implemented method of any of Aspect 10 to Aspect 17, wherein the unique identifier is associated with comment information comprising at least one of: a name of the participant user adding the comment, a timestamp of when the comment was created, a written description of the comment, one or more visibility restraints with the comment, or a resolution status of the comment.

Aspect 19. A computer-implemented method for collaborating on an electronic document, the computer-implemented method includes: accessing the electronic document in response to receiving input via a graphical user interface by a participant user of a collaborator group of one or more collaborator groups assigned to an entity of a plurality of entities, wherein said collaborator group and said entity are assigned access rights to the electronic document, causing the electronic document to be displayed via the graphical user interface, adding a comment to the electronic document via an entry by the participant user into the electronic document, assigning the comment a unique identifier, prompting the participant user to select a security designation for the comment in response to the comment being added to the electronic document, wherein the security designation comprises a selection of one or more collaborator groups of one or more entities of the plurality of entities to which to assign access rights to the comment, each group including one or more participant users, associating the security designation with the unique identifier of the comment, displaying the comment on the graphical user interface based on the security designation, modifying the security designation for the comment; and displaying the comment on the graphical user interface based on the security designation as modified.

Aspect 20. The computer-implemented method of Aspect 19, wherein the unique identifier is associated with comment information comprising at least one of: a name of the participant user adding the comment, a timestamp of when the comment was created, a written description of the comment, one or more visibility restraints with the comment, or a resolution status of the comment.

What is claimed is:

1. An electronic document collaboration system comprising:

a processor;

a memory component communicatively coupled to the processor; and one or more machine readable instructions stored in the memory component that cause the electronic document collaboration system to perform at least the following when executed by the processor:

access an electronic document in response to receiving input via a graphical user interface from a participant user of a collaborator group of one or more collaborator groups assigned to an entity of a plurality of entities, wherein said collaborator group and said entity are assigned access rights to the electronic document;

cause the electronic document to be displayed via the graphical user interface, wherein the electronic document is a two-dimensional document;

in response to display of the electronic document via the graphical user interface, add a comment within a comment overlay box on the electronic document via an entry by the participant user into the electronic document, wherein the comment overlay box indicates a status of the comment and associated comment chain, and the status of the comment comprises at least one of: a comment is open, closes, resolved, or any other similar status designation;

in response to addition of the comment to the electronic document via the entry by the participant user, assign the comment a unique identifier based on the comment being added, wherein the unique identifier is generated utilizing a database sequence method such that the unique identifier is not concurrently applied to another comment created within the electronic document;

in response to addition of the comment to the electronic document via the entry by the participant user, prompt the participant user to select a security designation for the comment such that the participant user is presented with an access rights graphical element overlayed on the comment overlay box including the security designation for selection when the participant user adds the comment, wherein the security designation comprises a selection of one or more collaborator groups of one or more entities of the plurality of entities to which to assign access rights to the comment, each group including one or more participant users;

in response to the selection of the one or more collaborator groups of the one or more entities of the plurality of entities to which the access rights to the comment are assigned, display a selected user indication via the graphical user interface indicative of the selection, wherein the selected user indication comprises a displayed graphical element representative of the selection of the one or more collaborator groups of the one or more entities to which the access rights to the comment are assigned; and associate the security designation as selected and displayed as the selected user indication with the unique identifier of the comment as assigned.

2. The electronic document collaboration system of claim 1, further comprising one or more machine readable instructions that cause the electronic document collaboration system to perform at least the following when executed by the processor:

display the comment on the graphical user interface based on the security designation.

3. The electronic document collaboration system of claim 1, further comprising one or more machine readable instructions that cause the electronic document collaboration system to perform at least one of the following when executed by the processor:

assign one or more access rights to one or more entities of the plurality of entities to the electronic document in response to receiving a selection input of the one or more entities from the participant user via an associated access rights graphical element, or assign the one or more access rights to the one or more collaborator groups of the one or more entities of the plurality of entities to the electronic document in response to receiving a selection input of the one or more collaborator groups from the participant user via an invite collaborators graphical element.

4. The electronic document collaboration system of claim 1, further comprising one or more machine readable instructions that cause the electronic document collaboration system to perform at least the following when executed by the processor:

modify the security designation for the comment; and display the comment on the graphical user interface based on the security designation as modified.

5. The electronic document collaboration system of claim 1, further comprising one or more machine readable instructions that cause the electronic document collaboration system to perform at least one of the following when executed by the processor:

receive a selection to resolve the comment, re-open the comment after resolution, close the comment, or re-open the comment after closure.

6. The electronic document collaboration system of claim 1, further comprising one or more machine readable instructions that cause the electronic document collaboration system to perform at least the following when executed by the processor:

add one or more responsive comments to the comment by at least one of the participant user, or one or more participant users associated with the security designation.

7. The electronic document collaboration system of claim 1, further comprising one or more machine readable instructions that cause the electronic document collaboration system to perform at least the following when executed by the processor:

receive a request to access the electronic document from one or more participant users of the one or more collaborator groups of the one or more entities of the plurality of entities assigned access rights to the electronic document;

display the electronic document and the comment via the graphical user interface to the one or more participant users in response to the one or more participant users being assigned access rights to the comment; and display the electronic document without the comment via the graphical user interface to the one or more participant users in response to the one or more participant users not being assigned the access rights to the comment.

8. The electronic document collaboration system of claim 1, further comprising one or more machine readable instructions that cause the electronic document collaboration system to perform at least one of the following when executed by the processor:

select an area of the electronic document to which to add the comment via the comment overlay box, or select an area of the electronic document to mark as deleted upon selection of a delete area icon as the comment.

9. The electronic document collaboration system of claim 1, wherein the unique identifier is associated with comment information comprising at least one of: a name of the participant user adding the comment, a timestamp of when the comment was created, a written description of the comment, one or more visibility restraints with the comment, or a resolution status of the comment.

10. A computer-implemented method for collaborating on an electronic document, the computer-implemented method comprising:

accessing the electronic document in response to receiving input via a graphical user interface from a participant user of a collaborator group of one or more collaborator groups assigned to an entity of a plurality of entities, wherein said collaborator group and said entity are assigned access rights to the electronic document;

causing the electronic document to be displayed via the graphical user interface, wherein the electronic document is a two-dimensional document;

in response to display of the electronic document via the graphical user interface, adding a comment within a comment overlay box on the electronic document via an entry by the participant user into the electronic document, wherein the comment overlay box indicates a status of the comment and associated comment chain, and the status of the comment comprises at least one of: a comment is open, closes, resolved, or any other similar status designation;

in response to addition of the comment to the electronic document via the entry by the participant user, assigning the comment a unique identifier, based on the comment being added, wherein the unique identifier is generated utilizing a database sequence method such that the unique identifier is not concurrently applied to another comment created within the electronic document;

in response to addition of the comment to the electronic document via the entry by the participant user, prompting the participant user to select a security designation for the comment such that the participant user is presented with an access rights graphical element overlayed on the comment overlay box including the security designation for selection when the participant user adds the comment, wherein the security designation comprises a selection of one or more collaborator groups of one or more entities of the plurality of entities to which to assign access rights to the comment, each group including one or more participant users;

in response to the selection of the one or more collaborator groups of the one or more entities of the plurality of entities to which access rights to the comment are assigned, displaying a selected user indication via the graphical user interface indicative of the selection, wherein the selected user indication comprises a displayed graphical element representative of the selection of the one or more collaborator groups of the one or more entities to which access rights to the comment are assigned; and associating the security designation as selected and displayed as the selected user indication with the unique identifier of the comment as assigned.

11. The computer-implemented method of claim 10, further comprising displaying the comment on the graphical user interface based on the security designation.

12. The computer-implemented method of claim 10, further comprising at least one of:

assigning one or more access rights to one or more entities of the plurality of entities to the electronic document in response to receiving a selection input of the one or more entities from the participant user via an associated access rights graphical element; or assigning one or more access rights to the one or more collaborator groups of the one or more entities of the plurality of entities to the electronic document in response to receiving a selection input of the one or more collaborator groups from the participant user via an associated invite collaborators graphical element.

13. The computer-implemented method of claim 10, further comprising:

modifying the security designation for the comment; and displaying the comment on the graphical user interface based on the security designation as modified.

14. The computer-implemented method of claim 10, further comprising at least one of:

resolving the comment;

re-opening the comment after resolution;

closing the comment; or re-opening the comment after closure.

15. The computer-implemented method of claim 10, further comprising at least one of: adding one or more responsive comments to the comment by the participant user, or one or more participant users associated with the security designation.

16. The computer-implemented method of claim 10, further comprising:

receiving a request to access the electronic document from one or more participant users of the one or more collaborator groups of the one or more entities of the plurality of entities assigned access rights to the electronic document;

displaying the electronic document and the comment via the graphical user interface to the one or more participant users in response to the one or more participant users being assigned access rights to the comment; and displaying the electronic document without the comment via the graphical user interface to the one or more participant users in response to the one or more participant users not being assigned access rights to the comment.

17. The computer-implemented method of claim 10, further comprising at least one of (i) selecting an area of the electronic document to which to add the comment via a comment overlay box, or (ii) selecting an area of the electronic document to mark as deleted upon selection of a delete area icon as the comment.

18. The computer-implemented method of claim 10, wherein the unique identifier is associated with comment information comprising at least one of, a name of the participant user adding the comment, a timestamp of when the comment was created, a written description of the comment, one or more visibility restraints with the comment, or a resolution status of the comment.

19. A computer-implemented method for collaborating on an electronic document, the computer-implemented method comprising:

accessing the electronic document in response to receiving input via a graphical user interface by a participant user of a collaborator group of one or more collaborator groups assigned to an entity of a plurality of entities, wherein said collaborator group and said entity are assigned access rights to the electronic document;

causing the electronic document to be displayed via the graphical user interface, wherein the electronic document is a two-dimensional document;

in response to display of the electronic document via the graphical user interface, adding a comment within a comment overlay box on the electronic document via an entry by the participant user into the electronic document, wherein the comment overlay box indicates a status of the comment and associated comment chain, and the status of the comment comprises at least one of: a comment is open, closes, resolved, or any other similar status designation;

in response to addition of the comment to the electronic document via the entry by the participant user, assigning the comment a unique identifier, based on the comment being added, wherein the unique identifier is generated utilizing a database sequence method such that the unique identifier is not concurrently applied to another comment created within the electronic document;

in response to addition of the comment to the electronic document via the entry by the participant user, prompting the participant user to select a security designation for the comment such that the participant user is presented with an access rights graphical element overlayed on the comment overlay box including the security designation for selection when the participant user adds the comment, wherein the security designation comprises a selection of one or more collaborator groups of one or more entities of the plurality of entities to which to assign access rights to the comment, each group including one or more participant users;

in response to the selection of the one or more collaborator groups of the one or more entities of the plurality of entities to which access rights to the comment are assigned, displaying a selected user indication via the graphical user interface indicative of the selection, wherein the selected user indication comprises a displayed graphical element representative of the selection of the one or more collaborator groups of the one or more entities to which access rights to the comment are assigned;

associating the security designation as selected and displayed as the selected user indication with the unique identifier of the comment as assigned;

displaying the comment on the graphical user interface based on the security designation;

modifying the security designation for the comment; and displaying the comment on the graphical user interface based on the security designation as modified.

20. The computer-implemented method of claim 19, wherein the unique identifier is associated with comment information comprising at least one of: a name of the participant user adding the comment, a timestamp of when the comment was created, a written description of the comment, one or more visibility restraints with the comment, or a resolution status of the comment.

* * * * *